(12) United States Patent
Andras

(10) Patent No.: US 7,073,986 B2
(45) Date of Patent: Jul. 11, 2006

(54) DIMPLED INSERT WITH RETAINING CLAMP

(75) Inventor: Linn R. Andras, Ligonier, PA (US)

(73) Assignee: Kennametal Inc., Latrobe, PA (US)

( * ) Notice: Subject to any disclaimer, the term of this patent is extended or adjusted under 35 U.S.C. 154(b) by 167 days.

(21) Appl. No.: 10/008,014

(22) Filed: Nov. 8, 2001

(65) Prior Publication Data

US 2003/0086766 A1 May 8, 2003

(51) Int. Cl.
*B23C 5/20* (2006.01)

(52) U.S. Cl. .................. 407/113; 407/114; 407/35; 407/40

(58) Field of Classification Search ............... 407/107, 407/111, 113, 114, 115, 116; 403/374.1, 374.2, 403/374.3, 13, 14
See application file for complete search history.

(56) References Cited

U.S. PATENT DOCUMENTS

| | | | |
|---|---|---|---|
| 2,031,334 A | 2/1936 | Severson | 29/99 |
| 3,156,032 A | 11/1964 | Lundgren | |
| 3,731,356 A | 5/1973 | Gowanlock | |
| 4,277,207 A | 7/1981 | Proulx | |
| 4,318,318 A * | 3/1982 | Schott | 82/1.11 |
| 4,321,846 A | 3/1982 | Neamtu | 407/109 |
| 4,395,168 A * | 7/1983 | Vicari | 408/20 |
| 4,477,212 A * | 10/1984 | Kraft | 407/104 |
| 4,480,950 A * | 11/1984 | Kraft et al. | 407/103 |
| 4,552,491 A * | 11/1985 | Parker | 407/107 |
| 4,606,679 A * | 8/1986 | Jeremias | 407/114 |
| 4,697,963 A * | 10/1987 | Luck | 407/105 |
| 5,076,738 A | 12/1991 | Pano et al. | 407/110 |
| 5,197,831 A * | 3/1993 | Shiratori et al. | 407/114 |
| 5,207,748 A * | 5/1993 | Katbi et al. | 407/114 |
| 5,477,754 A * | 12/1995 | Herbon | 76/101.1 |
| 5,658,100 A * | 8/1997 | Deiss et al. | 407/35 |
| 5,733,073 A | 3/1998 | Zitzlaff et al. | 407/107 |
| 5,820,311 A * | 10/1998 | Grun et al. | 407/102 |
| 5,836,723 A * | 11/1998 | Von Haas et al. | 407/107 |
| 5,944,457 A * | 8/1999 | Tjernstrom | 407/105 |
| 6,053,671 A * | 4/2000 | Stedt et al. | 407/35 |
| 6,176,649 B1 * | 1/2001 | Friedman | 407/110 |
| 6,217,264 B1 | 4/2001 | Kim et al. | |
| 6,224,300 B1 * | 5/2001 | Baxivanelis et al. | 407/114 |
| D445,810 S * | 7/2001 | Alexander, IV | D15/139 |
| 6,254,316 B1 * | 7/2001 | Strand | 407/113 |
| 2003/0219319 A1 * | 11/2003 | Arvidsson | 407/40 |

FOREIGN PATENT DOCUMENTS

| | | |
|---|---|---|
| DE | 1602817 A | 5/1970 |
| EP | 0901995 A2 | 3/1998 |
| GB | 1567004 A | 5/1980 |
| WO | WO 03/013770 A1 | 2/2003 |

* cited by examiner

*Primary Examiner*—Boyer D. Ashley
*Assistant Examiner*—Dana Ross
(74) *Attorney, Agent, or Firm*—Larry R. Meenan

(57) ABSTRACT

A wear insert for a tool holder includes a top surface and a bottom surface with a dimple disposed in the top surface. A boss is disposed within the dimple. The tool holder for releasably securing the wear insert has a tool holder body including an insert-receiving pocket formed at a forward end. The tool holder body has a bottom and at least one side wall for receiving an insert. The tool holder includes an internally threaded clamp-securing bore formed between an inclined surface and the insert-receiving pocket. A clamp is arranged on the tool holder body and including a lower face with a nose portion having a shaped lip and a clamp contour portion. The clamp also has a threaded aperture formed therethrough. A clamp screw is inserted into the threaded aperture of the clamp. The clamp screw has a threaded portion capable of being threaded onto the internally threaded clamp-securing bore of the tool holder body and the threaded aperture of the clamp to bring the nose portion of the clamp into pressing engagement with the boss of the wear insert.

27 Claims, 6 Drawing Sheets

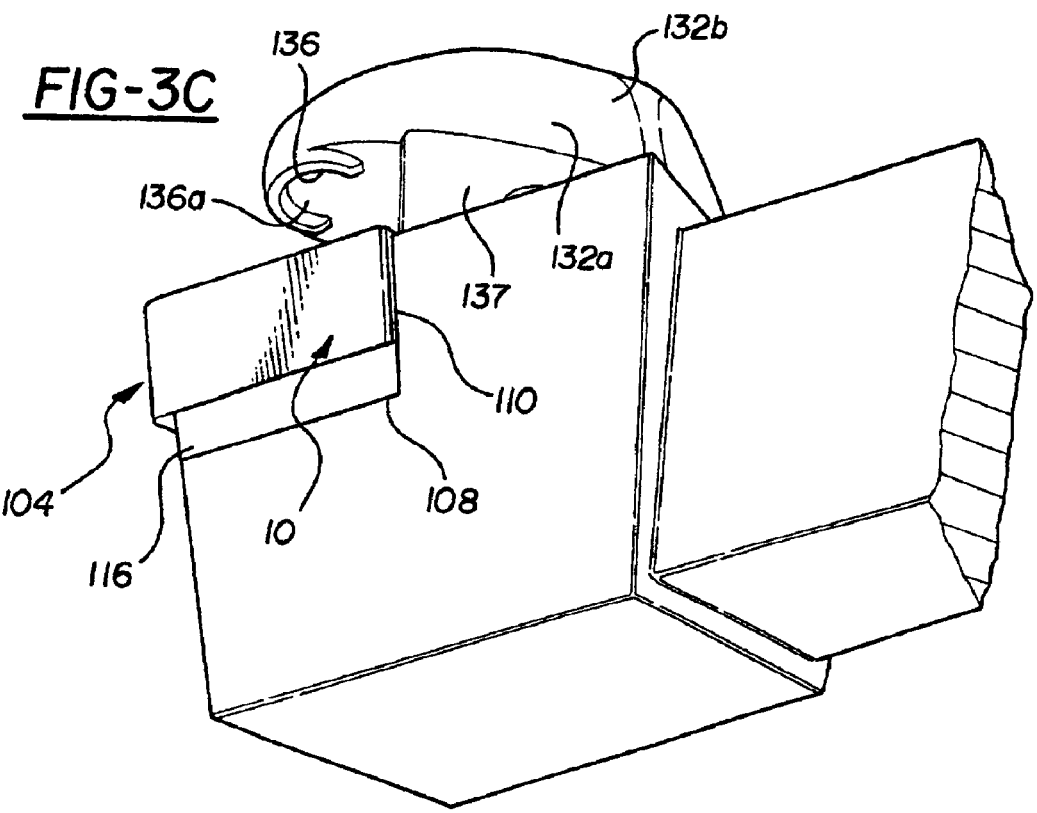
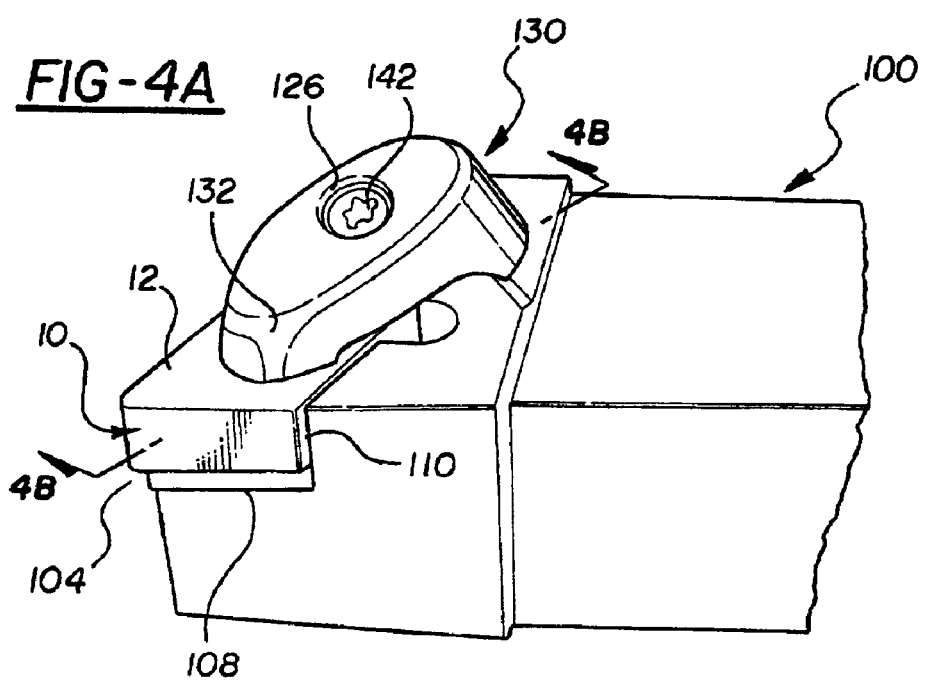

US 7,073,986 B2

DIMPLED INSERT WITH RETAINING CLAMP

TECHNICAL FIELD

The present invention relates to a wear insert and clamp. More particularly, the present invention relates to a dimpled insert that is releasably secured to a clamping tool holder.

BACKGROUND OF THE INVENTION

Wear inserts have a cutting angle, or angle of attack that is determined by the clamping alignment of a clamp on a clamping tool. Each wear insert has exclusively designed clamping means, which restricts the clamping envelope of a given insert for clamping tools that require a specific angle of attack. A plurality of inserts each having different clamping means are available to fulfill the need for different angles of attack on a clamping tool. The focus of the present invention is to eliminate the need for a plurality of inserts that are each designed for a single angle of attack and offer a single insert that is designed to have a plurality of attack angles, thereby unrestricting the clamping envelope of a wear insert.

SUMMARY OF THE INVENTION

Accordingly, the present invention is directed to a wear insert for a cutting device. The wear insert has a top surface and a bottom surface. A dimple is disposed in the top surface. A boss is disposed within the dimple.

The present invention is also directed to a combination tool holder and wear insert having a boss disposed within a dimple. The boss includes a boss wall and a boss surface. The tool holder body includes an insert-receiving pocket formed at a forward end having a bottom and at least one side wall for receiving the insert. The tool holder includes an internally threaded clamp-securing bore formed between an inclined surface and the insert-receiving pocket. A clamp is arranged on the tool holder body. The clamp includes a lower face with a nose portion having a shaped lip and a clamp contour portion. The clamp has a threaded aperture formed therethrough. A clamp screw is inserted into the threaded aperture of the clamp. The clamp screw has a threaded portion capable of being threaded onto the internally threaded clamp-securing securing bore of the tool holder body. The threaded aperture of the clamp to brings the clamp into pressing engagement with the insert. The shaped lip and clamp contour portion engages the boss wall and the boss surface of the wear insert when the clamp is brought into pressing engagement with the wear insert.

The present invention is also directed to a method of clamping an insert to a tool holder. The insert has a dimple with a boss disposed therein. The tool holder includes a tool holder body having an insert-receiving pocket formed at a forward end thereof and also having a bottom and at least one side wall. The insert-receiving pocket is capable of receiving the insert. The first step is arranging a clamp on the tool holder body. The clamp includes a lower face with a nose portion having a shaped lip portion and a clamp contour portion. The clamp has a threaded aperture formed therethrough. The second step is inserting a clamp screw into the aperture of the clamp. The clamp screw has a threaded portion capable of being threaded into the internally threaded clamp-securing bore of the tool holder to bring the clamp into pressing engagement with the insert. The shaped lip portion and the clamp contour portion of the clamp engages only a boss wall and a boss surface of the boss when the clamp is brought into pressing engagement with the insert.

BRIEF DESCRIPTION OF THE DRAWINGS

FIG. 3C is a bottom perspective view of a shaped lip portion and clamp contour portion of the combination clamping tool holder and wear insert in accordance with the present invention;

FIG. 4A is a top perspective view of the combination clamping tool holder and wear insert in a clamped position in accordance with the present invention;

DETAILED DESCRIPTION OF THE PREFERRED EMBODIMENTS

Figure 1:
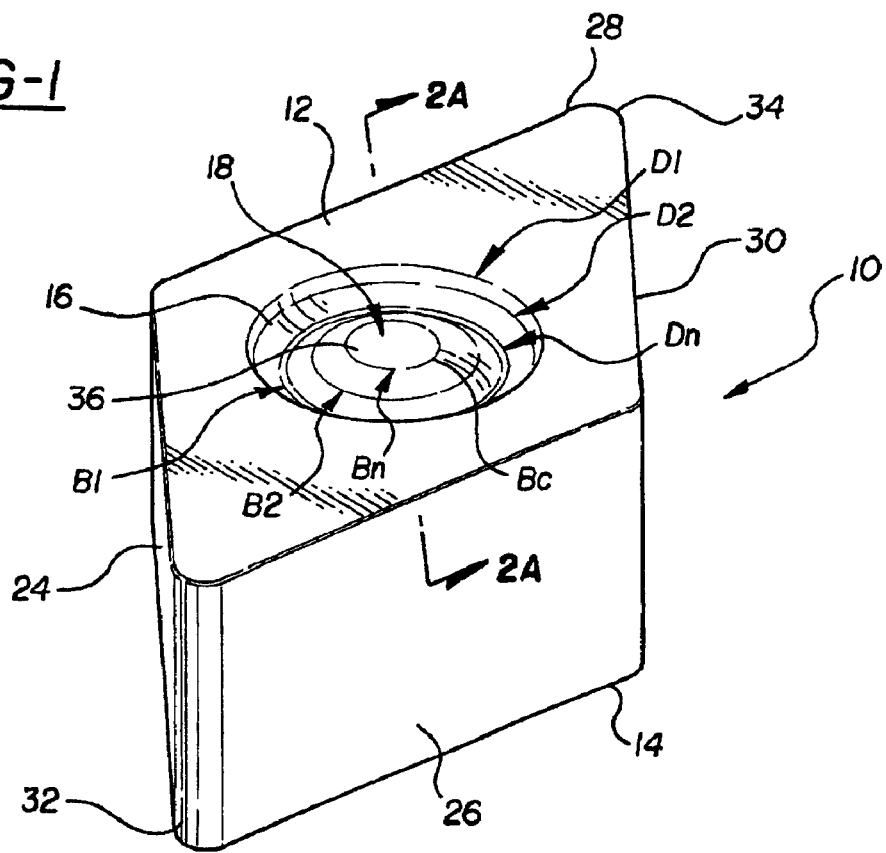
FIG. 1 is a perspective view of a dimpled wear insert in accordance with the present invention.
Figure 2A:
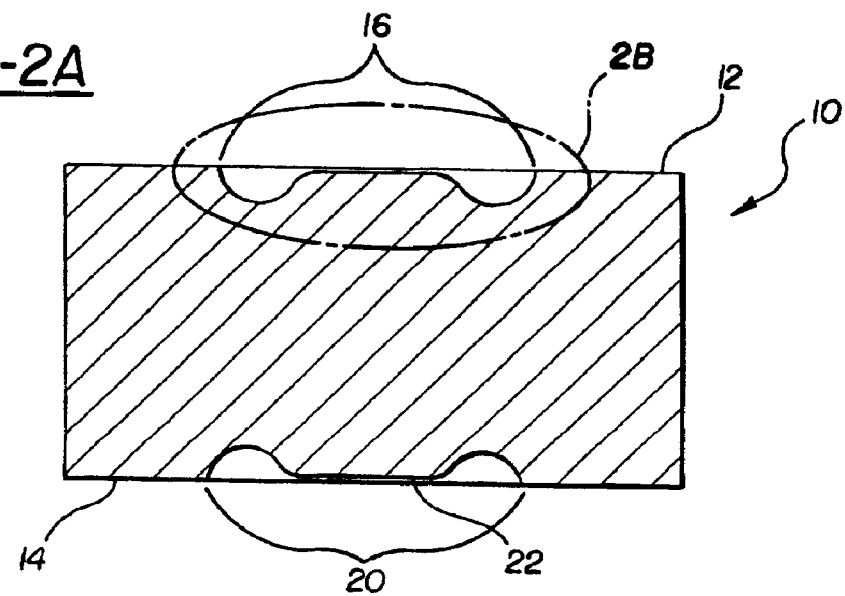
FIG. 2A is a cross-sectional view of the wear insert taken along line 2A of FIG. 1.
Figure 2B:
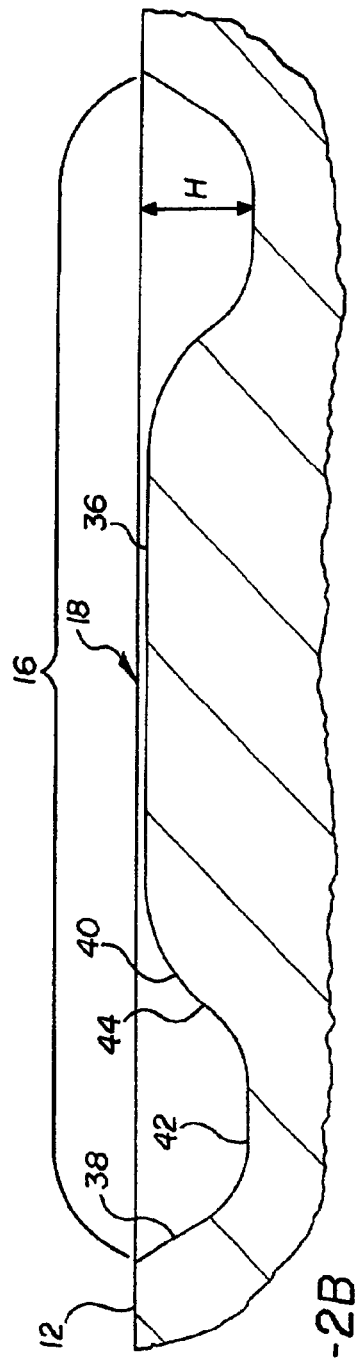
FIG. 2B is an enlarged cross-sectional view of the wear insert indicated by the circled area 2B of FIG. 2A.

One embodiment of a dimpled wear insert 10 in accordance with the invention is shown in FIGS. 1 and 2A–2B. The wear insert 10 has a top surface 12, a bottom surface 14, a first dimple 16 disposed in the top surface 12, a first boss 18 disposed within the first dimple 16, a second dimple 20 disposed in the bottom surface 14, and a second boss 22 disposed within the second dimple 20. The wear insert 10 also includes first and second front faces 24, 26, and first and second rear faces 28, 30. The first and second front faces 24, 26 meet to form a first cutting edge 32. Similarly, the first and second rear faces 28, 30 meet to form a second cutting edge 34.

The wear insert 10 is selectively designed to have a substantially square shape, or as shown in FIG. 1, a shape similar to a parallelogram. However, the wear insert 10 may also be any desired shape, such as round, triangle, octagon or the like. The first dimple 16 is shown centrally disposed in the top surface 12 of the wear insert 10 and has an outer diameter D1. In the illustrated embodiment, the first dimple 16 has a bowl shape defined by a series of decreasing outer diameters D2–Dn with respect to D1. Alternatively, the first dimple 16 may be defined by a single outer diameter D1 that extends in a cylindrical shape and terminates at Dn. Centrally disposed within the dimple 16 is the first boss 18. The first boss 18 has an outer shape, for example, a diameter B1 that extends from the dimple bottom 44 toward the top surface 12 with a series of decreasing outer diameters B2–Bn. The last diameter Bn forms a circumference Bc defining a generally planar boss surface 36. The second dimple 20 and second boss 22 may be formed on the bottom surface 14 in a similar fashion. Alternatively, the second boss may have a different form resembling any of the bosses seen in FIGS. 1A–1F.

FIGS. 1A–1F show a plurality of different top views for boss designs that may be used within the dimples 16, 20 for the insert 10. The bosses 18, 22 have a series of decreasing outer diameters B1–Bn that closely resemble a boss 18a shown in FIG. 1A. A boss wall 40a is formed by the series of proportionally decreasing outer diameters B1–Bn extending from a dimple bottom 42 (FIG. 2B) and terminates at a boss surface 36a. Because the outer diameters B1–Bn may decrease at a slow rate or an exponential rate, the boss wall 40a may have a generally flat slope, a U-shaped slope, or even an S-shaped slope. Relating to FIG. 1A, FIG. 1B also shows a boss 18b with a circular formation. The boss wall 40b generally retains the same diameter as it extends from the dimples 16, 20 (FIG. 1) at the dimple bottom 42 and terminates at a boss surface 36b, thereby forming a substantially cylindrical-shaped boss.

Figure 1A:
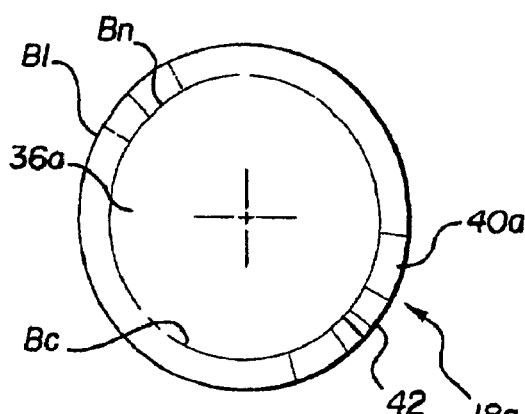
FIGS. 1A–1F are top views of bosses each having a different boss wall.
Figure 1B:
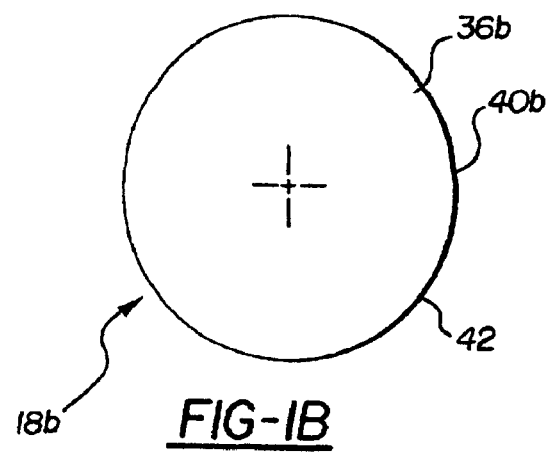
Figure 1C:
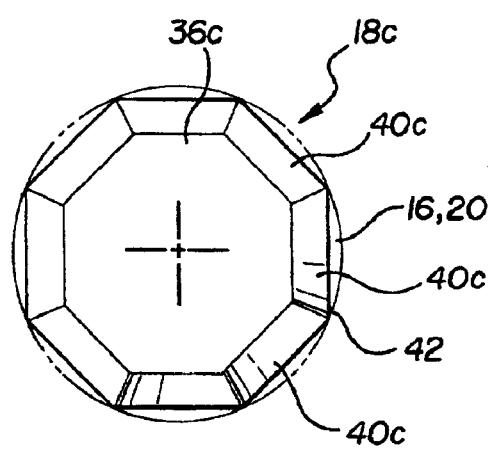
Figure 1D:
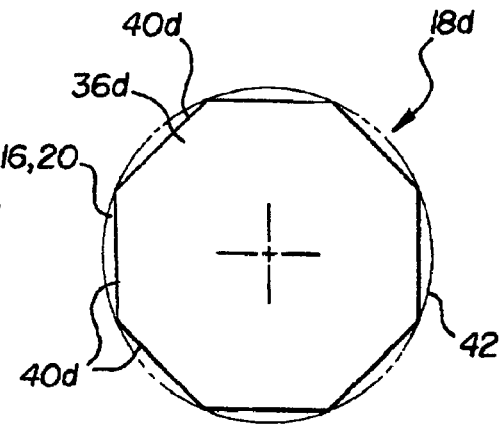

As seen in FIG. 1C, a boss 18c may have a plurality of boss walls 40c, for example, eight boss walls 40c. Each boss wall 40c may be defined as a tapered flat that extends from the dimples 16, 20 at the dimple bottom 42 and terminates at a boss surface 36c. Relating to FIG. 1C, FIG. 1D also shows a boss 18d with a plurality of boss walls 40d. Such boss wall 40d extends generally vertically from the dimples 16, 20 at the dimple bottom 42 and terminates at a boss surface 36d.

Figure 1E:
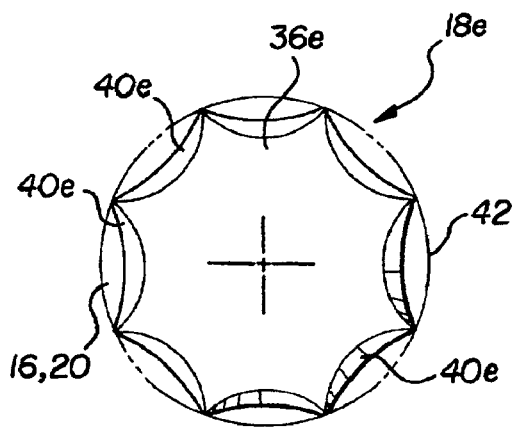
Figure 1F:
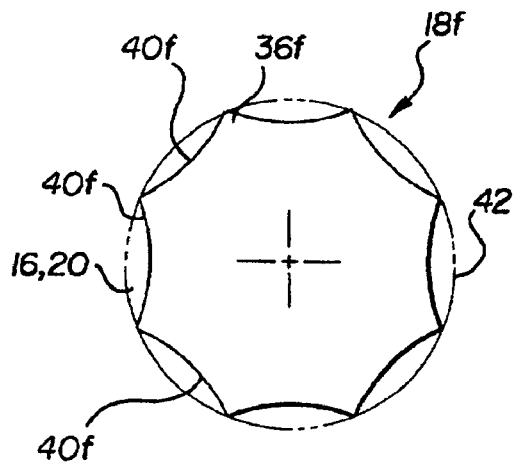

As seen in FIG. 1E, a boss 18e may have a plurality of boss walls 40e, for example, eight boss walls 40e. Each boss wall 40e may be defined as a tapered indentation that extends from the dimples 16, 20 at the dimple bottom 42 and terminates at a boss surface 36e. Relating to FIG. 1E, FIG. 1F also shows a boss 18f with a plurality of boss wall indentations 40f. Each boss wall 40f extends generally vertically from the dimples 16, 20 at the dimple bottom 42 and terminates at a boss surface 36f.

FIGS. 2A and 2B show a cross-sectional view of the wear insert 10. The first and second dimples 16, 20 and first and second boss 18, 22 are shown centrally disposed on the top and bottom surfaces 12, 14 of the wear insert 10. The enlarged view in FIG. 2B of the top surface 12 of the wear insert 10 is taken along dashed line 2B in FIG. 2A.

Referring to FIG. 2B, the boss 18 extends from the dimple bottom 42 to a maximum height H located near the boss surface 36 such that boss surface 36 is on a slightly lower plane than that of the top surface 12. A dimple wall 38 and a boss wall 40 are also shown in FIG. 2B. The dimple wall 38 has a generally similar slope and tapers slightly as it reaches the dimple bottom 42, or zero slope point of the dimple 16. The boss wall 40 has two generally different slopes that forms an S-shaped boss wall. Similar gradual slopes are seen near the dimple bottom 42 and boss surface 36. An inflection point 44 that is near the middle (~½H) of the boss wall 40 has a steeper slope than any other point along the boss wall 40. Thus, as the boss wall 40 approaches the boss surface 36, the slope gradually tapers off, thereby completing the S-shaped boss wall 40.

Figure 3A:
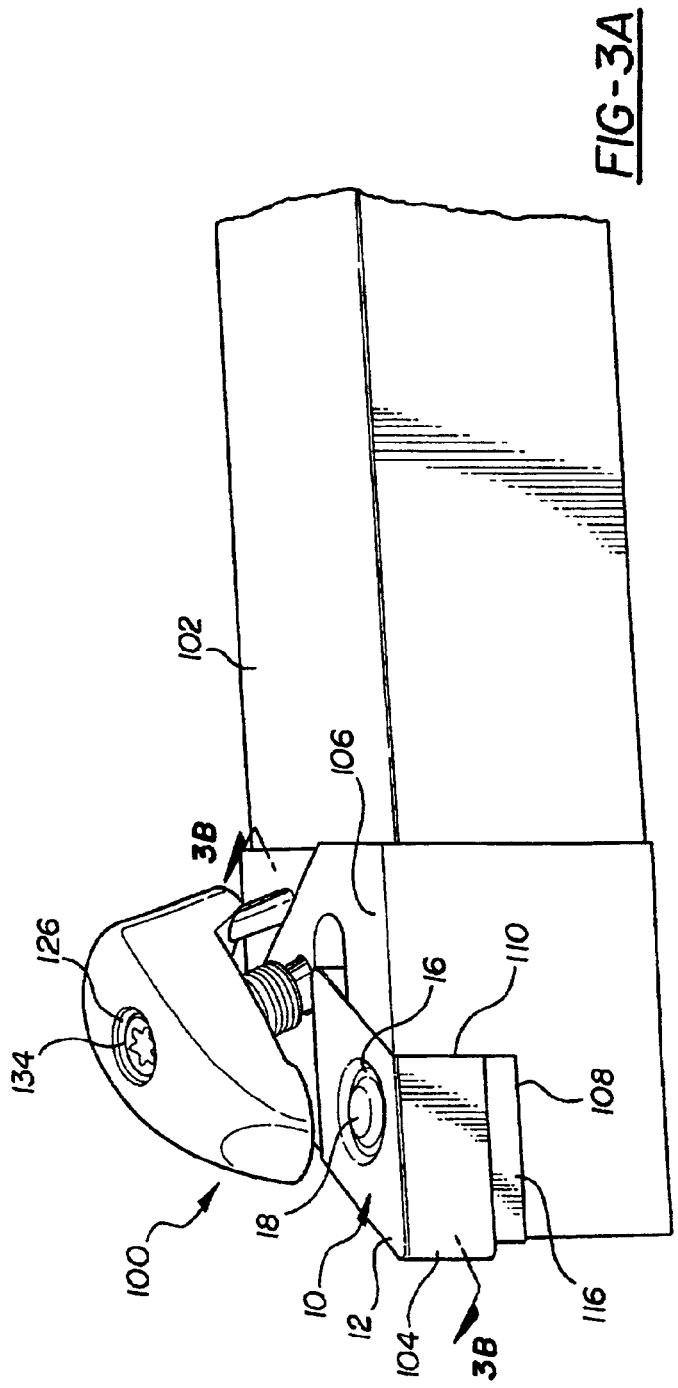
FIG. 3A is a top perspective view of a combination clamping tool holder and wear insert in an unclamped position in accordance with the present invention.
Figure 3B:
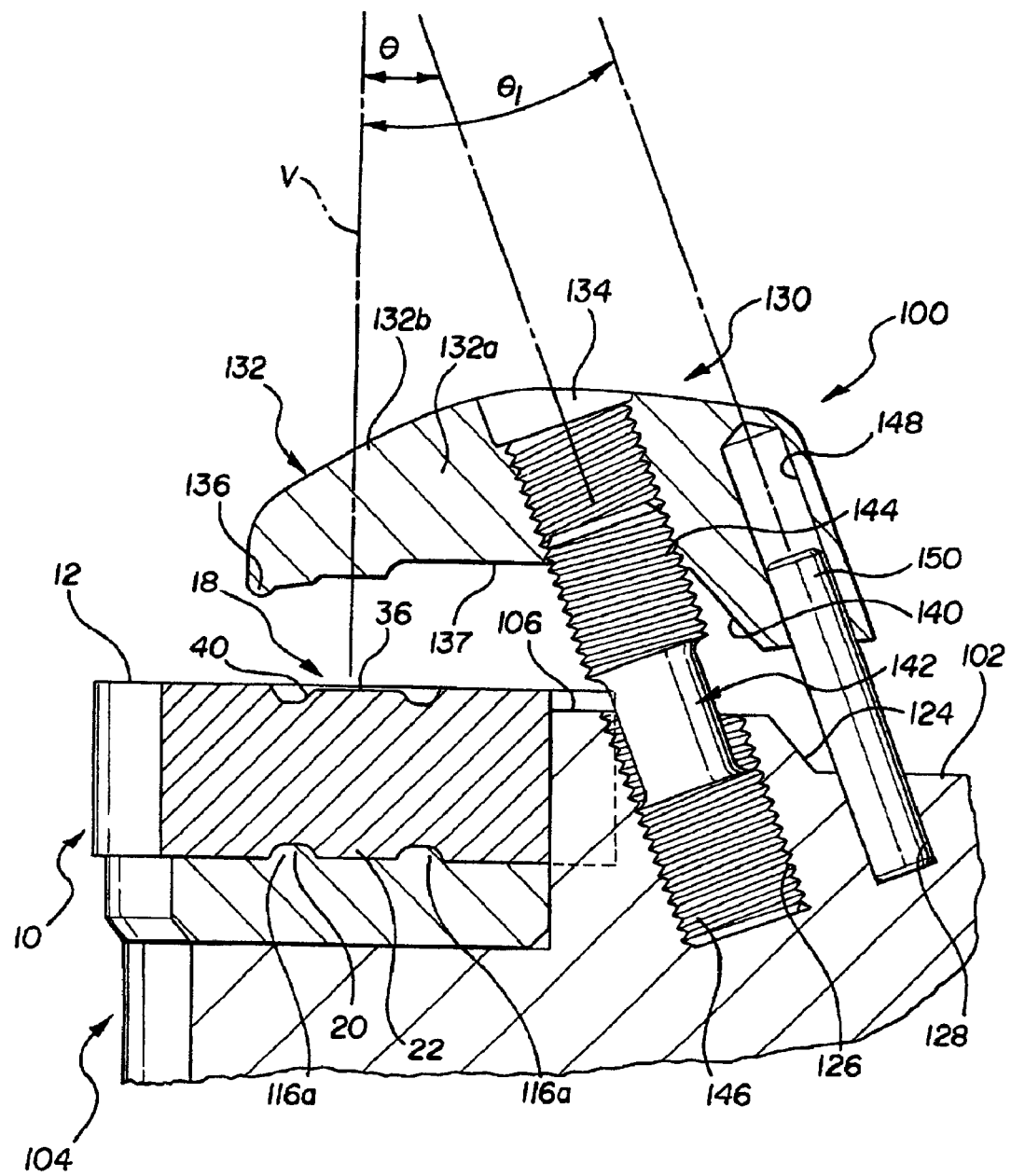
FIG. 3B is a cross-sectional view of the combination clamping tool holder and wear insert taken along line 3B of FIG. 3A.

One embodiment of a clamping tool holder 100 for accommodating the insert 10 is shown in FIGS. 3A–3B. The clamping tool holder 100 comprises a tool holder body 102 having an insert-receiving pocket 104 formed in its upper surface 106 at a corner of its forward end portion. The insert receiving pocket 104 has a bottom 108 and angularly-disposed side walls 110. A seat member 116 may be used to mount the insert 10 in the tool holder 100. The seat member 116 may have an embossed upper surface area 116a (FIGS. 3B and 4B) that is capable of mating with the second dimple 20 and boss 22. Alternatively, the seat member 116 may have a generally flat upper surface. In an alternative embodiment, the insert 10 can be disposed on the bottom 108 of the pocket 104 without the use of the seat member 116.

As best seen in FIG. 3B, an inclined surface 124 sloping away from the insert-receiving pocket 104 is formed on the upper surface 106 of the tool holder body 102 which is displaced rearwardly of the tool body with respect to the pocket 104. The inclined surface 124 is preferably at a prescribed angle with respect to a vertical axis V. An internally threaded clamp-securing bore 126 is formed in the tool holder 100 and is located between the inclined surface 124 and the insert-receiving pocket 104. The clamp-securing bore 126 is preferably at a prescribed acute inclination angle, θ, with respect to the vertical axis, V, of the insert 10.

The tool holder 100 further includes a pin-receiving bore 128 formed in the tool holder 100. The pin-receiving bore 128 maintains alignment of the clamp 130 and the tool body as the clamp 130 presses downward and rearward on the insert 10. The inclined surface 124 can be located between the pin-receiving bore 128 and the clamp-securing bore 126. Preferably, the pin-receiving bore 126 has an inclination angle, $\theta_1$, with respect to the vertical axis, V, of the insert 10 that is approximately the same as the inclination angle, θ, defined between the clamp-securing bore 126 and the vertical axis, V, of the insert 10. In other words, the pin-receiving bore 128 and the clamp-securing bore 126 are substantially parallel to each other. It should be noted that the angle of the inclined surface 124 with respect to the insert 10 may be approximately the same or may be different than the prescribed angle of the clamp-securing bore 126 with respect to the insert 10.

The clamp, shown generally at 130, is arranged on the upper surface 106 of the tool holder body 102. As best shown in FIG. 3B, the clamp 130 is of a generally C-shape in side elevation having a tapered forward portion 132 and tapered side portions 132a, 132b to provide a low profile design. The low profile design facilitates the removal of chips during the cutting process. Formed in the center of the clamp 130 is an aperture 134 which has approximately the same diameter as the clamp-securing bore 126 of the tool holder 100. As best shown in FIG. 3A, the aperture 134 is formed so that its axis is concentric with the axis of the clamp-securing bore 126.

As best seen in FIG. 3C, the lower face of the forward portion 132 of the clamp 130 includes a shaped lip portion 136 to be held in engagement with the boss wall 40 of the boss 18 of the insert 10. The shaped lip portion 136 also includes a clamp contour portion 136a (FIG. 4C) to facilitate in the engagement of the shaped lip portion 136 with the boss wall 40 and boss surface 36 of the insert 10. The shaped lip portion 136 and clamp contour portion 136a may also be configured to match any the bosses 18a–18f seen in FIGS. 1A–1F. The illustrated shaped lip portion 136 is a generally semi-circular shape that is formed to mate with the boss wall 40. The clamp contour portion 136a is a dome-shape formed to mate with the boss surface 36.

One advantage of the invention is that the combination of the shaped lip portion 136 and the boss 18 provides a virtually infinite number of angles of attack. By contrast, conventional inserts are limited to a single angle of attack for a given tool holder 100. The invention eliminates the need for a plurality of inserts that are each designed for a single angle of attack and offers a single insert 10 that encompasses all angles of attack. The insert 10 thereby unrestricts its clamping envelope, unlike conventional inserts.

Referring back to FIG. 3B, the clamp 130 has an inclined surface 140 formed at a proximal end thereof so as to protrude downward and rearward with respect to the insert 10. Preferably, the inclined surface 140 is at approximately the same angle as the angle of the inclined surface 124 of the holder 102 to enable the inclined surfaces 124, 140 to act as a ramp to enable the clamp 130 to more easily slide downward and rearward when the clamp 130 is brought into pressing engagement with the insert 10. The inclined surfaces 124, 140 acting as a ramp provide a crucial "pull back" feature of the invention.

It should be noted that the relative angle between the clamp-securing bore 126 and the inclined surfaces 124, 140 can be "tuned" to provide a desired downward force and/or rearward force on the insert 10. Preferably, the angle of the clamp-securing bore 126 of the inclined surfaces 124, 140 are approximately 40 degrees with respect to the vertical axis, V, to provide slightly more downward force than rearward force on the insert 10. However, it will be appreciated that the relative angle between the clamp-securing bore 126 and the inclined surfaces 124, 140 be the same angle or may differ by any desired amount. For example, the inclined surfaces 124, 140 may have an angle of zero degrees and the clamp-receiving bore 126 may have an angle of 40 degrees or more with respect to the vertical axis, V. In this example, a single threaded screw can be used with a clamp having an unthreaded aperture and the guide pin 150 can be eliminated.

The clamp 130 is secured to the tool holder body 102 by means of a double-ended clamp screw 142 having opposite threaded portions 144, 146 which is inserted through the aperture 134 and screwed into the threaded clamp-securing bore 126 and the aperture 134 of the clamp 130. The threaded portion 144 and the aperture 134 are threaded in a direction opposite to the threaded portion 146 and the clamp securing bore 126 of the tool holder body 102. For example, the bore 126 of the tool holder body 102 may have right hand threads and the aperture 134 of the clamp 130 may have left hand threads. The acute inclination angle, θ, of the clamp-securing bore 126 allows the clamp 130 to move downward and rearward as the clamp screw 142 is tightened. The use of a double-threaded clamp screw 142 allows the indexing of the clamp 130 to be twice as fast as conventional tool holders using spring mechanisms and the like, thereby reducing downtime and increasing production time. It will be appreciated that the threads of the aperture 134 and the bore 126 may be slightly larger than the threads of the clamp screw 142 to allow for variations in design, i.e. manufacturing tolerances in the tool holder 100.

A lower face 138 of the clamp 130 also includes a pin-receiving bore 148 positioned rearward of the inclined surface 140 and the aperture 134. The pin-receiving bore 148 of the clamp 130 is formed so that its axis is substantially concentric with the axis of the pin-receiving bore 128 of the tool holder body 102. A guide pin 150 is disposed within the pin-receiving bores 128, 148 to prevent the clamp 130 from spinning or twisting in an axial direction (in a direction perpendicular to the direction of travel of the clamp screw 142) when turning of the clamp screw 142 to loosen or tighten the clamp 130. Although the guide pin 150 can be formed of a solid pin, the guide pin 150 is preferably formed of a slotted spring pin that can flex, expand or compress to allow for variations in design and wear of the tool holder 100. Specifically, the slotted spring pin 150 can flex to maintain the relative positions of the aperture 134, the bore 126, the pin-receiving bore 128 and the pin-receiving bore 148 to compensate for changes in the inclination angle, $\theta_1$, that may result due to manufacturing tolerances and wear of the tool body 102, the mounting boss wall 40, and the clamp 130 (i.e., alignment creep). The guide pin 150 can be press fit into the pin-receiving bore 128 of the tool holder body 102. The length of the guide pin 150 is selected to allow the clamp 130 to move away from the insert 10 while preventing the clamp 130 from spinning or twisting in the axial direction.

Preferably, the diameter of the pin-receiving bore 148 can be slightly larger than the diameter of the guide pin 150 to allow free movement of the guide pin 150 within the pin-receiving bore 148. In addition, the diameter of the pin-receiving bore 128 can be slightly larger than the diameter of the guide pin 150. It will be appreciated that the pin-receiving bore 148 and guide pin 150 can be eliminated by forming the inclined surfaces 124, 140 with convex, concave or contour complementary shaped surfaces. Oppositely, the inclined surfaces 124, 140 can be eliminated and made integral with the guide pin 150 or attached as a separate component when retrofitting a conventional tool holder.

Figure 4B:
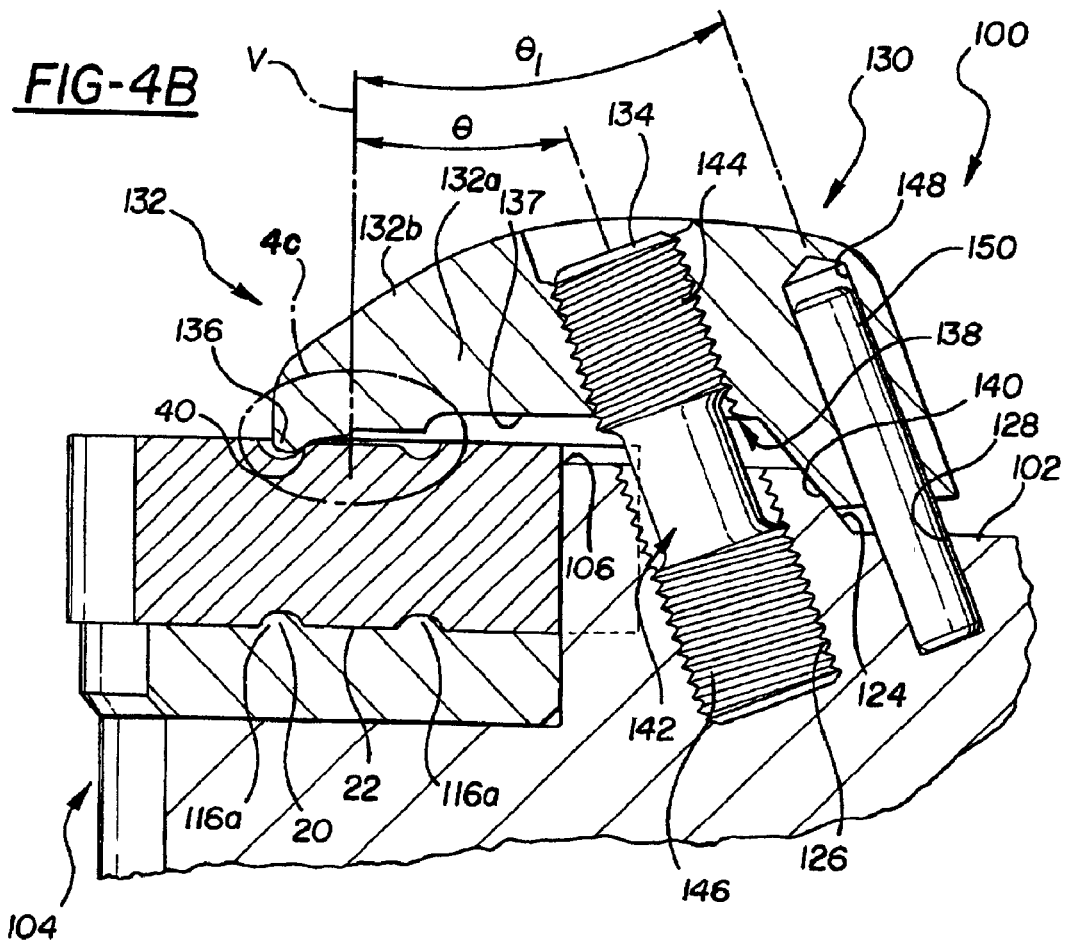
FIG. 4B is a cross-sectional view of the combination clamping tool holder and wear insert taken along line 4B of FIG. 4A.
Figure 4C:
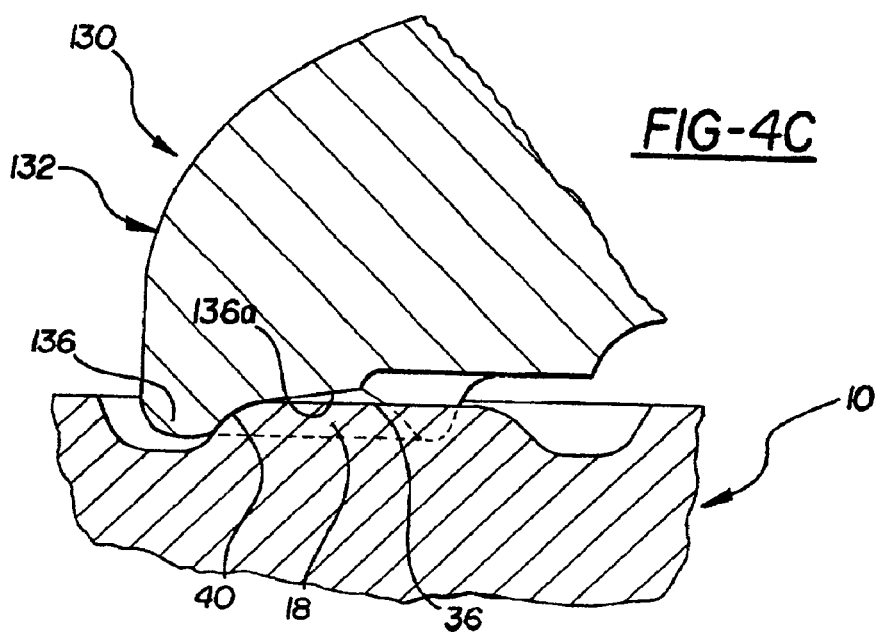
FIG. 4C is an enlarged cross-sectional view showing pressing engagement of the combination clamping tool holder and wear insert indicated by the circled area 4C of FIG. 4A.

With reference to FIGS. 4A–4C, the clamping operation of the tool holder 100 using the clamp 130 will now be described. Because the clamping operation is usually required only when replacing the cutting insert 10 with a new one, it is not necessary to move the clamp 130 from the upward or unclamped position as shown in FIG. 3B. Therefore, there may be provided a stop member (not shown) to prevent the clamp screw 142 from being further loosened.

From the state shown in FIGS. 3A–3C where the clamp screw 142 is loosened, and the tool holder 100 is in an unclamped position. The clamp screw 142 is first screwed into the clamp-securing bore 126 to cause the clamp 130 to move downward and rearward with respect to the insert 10. The clamp 130 is guided by guide pin 150 as it moves downward and rearward along the axis of the pin-receiving bore 128 of the tool holder body 102.

As seen from a top perspective view in FIG. 4A, the clamp 130 is further tightened by turning the clamp screw 142 until the tool holder 100 is in a clamped position. The forward portion 132 of the clamp 130 is caused to positively engage the boss 18 of the insert 10 without abutting against the upper face of the insert 12. Then, the shaped lip portion 136 presses against the boss wall 40, forcing the insert 10 toward the bottom 108 and the side wall 110 of the pocket 104. If an embossed surface 116*a* is provided on the upper surface of the seat member 116, the second dimple 20 and boss 22 are compressed onto the embossed surface 116*a*. In addition, the inclined surfaces 124, 140, act as a ramp to cause the clamp 130 to press the insert 10 downward and rearward to further secure the insert 10 in the pocket 104.

As best shown in FIG. 4C, one important aspect of the invention is that the shaped lip portion 136 and clamp contour portion 136*a* of the clamp 130 only engages the boss wall 40 and boss surface 36, respectively, when the clamp 130 is brought into pressing engagement with the insert 10. Specifically, the shaped lip portion 136 of the clamp 130 engages only the front portion of the boss wall 40. Once the shaped lip portion 136 engages the boss wall 40, the clamp contour portion 136*a* engages only the boss surface 36.

It will be appreciated that the tool holder of the invention is not limited by the type and shape of the insert 10, and that the invention can be practiced with any desirable shape and type of insert. For example, when the insert 10 is of a triangular in shape, rather than square or rectangular, the receiving pocket 104 can also be triangular in shape to accommodate the shape of the insert 10.

When removing the insert 10 from the tool holder body 102, the clamp screw 142 is turned to cause the clamp 130 to move obliquely along the inclined surface 124 while being urged upwardly so that the pressing force of the shaped lip portion 136 and clamp contour portion 136*a* of the clamp 130 against the boss wall 40 and boss surface 36 until the insert 10 is released. As the clamp 130 is further loosened, the inclined surface 140 is separated from the inclined surface 124, as shown in FIGS. 3A–3C. In this released or unclamped position, the shaped lip portion 136 of the clamp 130 is positioned above the insert 10 such that the insert 10 can be easily removed, repositioned, or replaced.

If the cutting edge 32 is used, the insert 10 may be rotated 180 degrees in the insert receiving pocket 104 so that the other cutting edge 34 may be used. If the first boss 18 has a similar design as the second boss 22, the insert 10 may be turned over for using the opposite cutting edge 32, 34 in the tool holder 100 because of the similar design of the second boss 22. Alternatively, if the second boss 22 has a different design than the first boss 18, the insert 10 may be removed and inserted into a different tool holder 100 that has a clamp with a different attack angle and shaped lip portion design to mate with the alternative design for the second boss 22. Accordingly, the clamp 130 is released such that replacing the insert 10 can be conducted efficiently.

As described above, the clamp 130 is caused to move downward and rearward by means of the double-ended clamp screw 142 to engage only the boss wall 40 and boss surface 36 of the wear insert 10. When the clamp 130 engages only the boss wall 40 and boss surface 36, the wear insert 10 is brought into pressing engagement with the bottom 108 and the side faces 110 of the pull back clamping tool holder 100 to exert a substantially uniform clamping force on the wear insert 10 for a particular angle of attack. The combination of the wear insert 10 and the tool holder 100 allows a virtually infinite number of angles of attack and unrestricts the clamping envelope of the wear insert 10.

While the invention has been specifically described in connection with certain specific embodiments thereof, it is to be understood that this is by way of illustration and not of limitation, and the scope of the appended claims should be construed as broadly as the prior art will permit.

What is claimed is:

1. A wear insert for a cutting device, comprising:
   a top surface terminating at a cutting edge,
   a bottom surface,
   a first dimple disposed in the top surface, the first dimple spaced from the cutting edge, and
   a first boss disposed within the first dimple, the first boss without a center hole,
   wherein the first boss has a first boss surface on a plane lower than that of the top surface.

2. The wear insert according to claim 1, wherein the first dimple is centrally disposed in the top surface.

3. The wear insert according to claim 2, wherein the first dimple on the top surface extends into the wear insert at the first outer diameter and terminates at the first dimple bottom.

4. The wear insert according to claim 2, wherein the first dimple on the top surface extends into the wear insert at the outer diameter with a series of decreasing outer diameters and terminates at the first dimple bottom.

5. The wear insert according to claim 2, wherein the first boss is centrally disposed within the first dimple bottom, the first boss has an outer shape that extends from the dimple bottom to the top surface to form a boss wall.

6. The wear insert according to claim 5, wherein the boss wall is formed by a plurality of proportionally decreasing outer shapes, and terminates with the boss surface.

7. The wear insert according to claim 5, wherein the boss wall is formed by extending the boss wall vertically from the dimple bottom and terminates with the boss surface.

8. The wear insert according to claim 6, wherein the outer shapes may be circular, multi-faceted, or indented multi-faceted.

9. The wear insert according to claim 2, wherein the bottom surface further includes a second dimple disposed in the bottom surface.

10. The wear insert according to claim 9, wherein the second dimple disposed in the bottom surface includes a second boss disposed within the second dimple, the second boss having a second boss surface, and the second boss having at least one second boss wall between the second dimple bottom and the second boss surface.

11. A combination tool holder and wear insert, the wear insert having a dimple and boss, the boss disposed within the dimple, the boss having a boss wall and a boss surface, comprising:
   (a) a tool holder body including an insert-receiving pocket formed at a forward end thereof and having a bottom and at least one side wall for receiving the insert, the tool holder including an internally threaded clamp-securing bore formed between an inclined surface and the insert-receiving pocket;
   (b) a clamp arranged on the tool holder body, the clamp including a lower face with a nose portion having a shaped lip and a clamp contour portion, the clamp having a threaded aperture formed therethrough;
   (c) a clamp screw inserted into the threaded aperture of the clamp, the clamp screw having a threaded portion capable of being threaded onto the internally threaded clamp-securing bore of the tool holder body and the threaded aperture of the clamp to bring the clamp into pressing engagement with the insert, and
   wherein the shaped lip and clamp contour portion engages the boss wall and the boss surface of the wear insert when the clamp is brought into pressing engagement with the wear insert.

12. The combination tool holder and wear insert according to claim 11, wherein the inclined surface has a prescribed angle with respect to the boss of the wear insert, and wherein the clamp further includes an inclined surface formed at a proximal end having approximately the same prescribed angle as the inclined surface of the tool holder.

13. The combination tool holder and wear insert according to claim 12, wherein the angle between the inclined surface of the tool holder and the inclined surface of the clamp is different than the angle between the boss and the clamp-securing bore of the tool holder.

14. The combination tool holder and wear insert according to claim 11, wherein the tool holder also includes a pin-receiving bore formed therein, and wherein the clamp also includes a pin-receiving bore formed therein.

15. The combination tool holder and wear insert according to claim 14, further including a guide pin capable of being received with the pin-receiving bore of the tool holder and the pin-receiving bore of the clamp.

16. The combination tool holder and wear insert according to claim 14, wherein the pin-receiving bore of the tool holder and the pin-receiving bore of the clamp are formed at an angle approximately equal to an angle formed between the boss and the clamp-securing bore of the tool holder.

17. The combination tool holder and wear insert according to claim 11, wherein the clamp screw is a double-ended clamp screw having a first threaded portion and a second threaded portion being threaded in a direction opposite than the first threaded portion, the first threaded portion capable of being threaded onto the clamp screw, the second threaded portion capable of being threaded into the internally-threaded clamp-securing bore.

18. The combination tool holder and wear insert according to claim 11, wherein the first dimple is centrally disposed in the top surface, and wherein the first dimple has a first outer diameter on the top surface.

19. The combination tool holder and wear insert according to claim 18, wherein the first dimple on the top surface extends into the wear insert at the first outer diameter and respectively terminates at the first dimple bottom.

20. The combination tool holder and wear insert according to claim 18, wherein the first dimple on the top surface extends into the wear insert at the outer diameter with a series of decreasing outer diameters and terminates at the first dimple bottom.

21. The combination tool holder and wear insert according to claim 18, wherein the first boss is centrally disposed within the first dimple bottom, the first boss has an outer shape that extends from the dimple bottom to the top surface to form a boss wall.

22. The combination tool holder and wear insert according to claim 21, wherein the boss wall is formed by a plurality of proportionally decreasing outer shapes, and terminates with a generally flat first boss surface.

23. The combination tool holder and wear insert according to claim 21, wherein the boss wall is formed by the boss wall extending vertically from the dimple bottom and terminates with a generally flat first boss surface.

24. The combination tool holder and wear insert according to claim 21, wherein the outer shapes may be circular, multi-faceted, or indented multi-faceted.

25. The combination tool holder and wear insert according to claim 18, wherein the bottom surface further includes a second dimple disposed in the bottom surface.

26. The combination tool holder and wear insert according to claim 25, wherein the second dimple disposed in the bottom surface includes a second boss disposed within the second dimple, the second boss having a second boss surface, and the second boss having at least one second boss wall between the second dimple bottom and the second boss surface.

27. A method of clamping a wear insert to a tool holder, the wear insert having a dimple with a boss disposed therein, the tool holder including a tool holder body having an insert-receiving pocket formed at a forward end thereof and having a bottom and at least one side wall, the insert-receiving pocket capable of receiving the wear insert, comprising the steps of:

(a) arranging a clamp on the tool holder body, the clamp including a lower face with a nose portion having a shaped lip portion and a clamp contour portion, the clamp having a threaded aperture formed therethrough;

(b) inserting a clamp screw into the aperture of the clamp, the clamp screw having a threaded portion capable of being threaded into the internally threaded clamp-securing bore of the tool holder to bring the clamp into pressing engagement with the wear insert, whereby the shaped lip portion and the clamp contour portion of the clamp engages only a boss wall and a boss surface of the boss when the clamp is brought into pressing engagement with the wear insert.

* * * * *